(12) United States Patent
Morimoto et al.

(10) Patent No.: US 8,799,965 B2
(45) Date of Patent: Aug. 5, 2014

(54) ON-TRAIN INFORMATION PROVIDING DEVICE, ON-TRAIN INFORMATION PROVIDING SYSTEM, AND AUDIO DATA PROVIDING METHOD

(75) Inventors: Kazunari Morimoto, Tokyo (JP); Masao Oki, Tokyo (JP); Atsuhiko Nagamune, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 269 days.

(21) Appl. No.: 13/148,717

(22) PCT Filed: Mar. 23, 2009

(86) PCT No.: PCT/JP2009/055691
§ 371 (c)(1),
(2), (4) Date: Aug. 10, 2011

(87) PCT Pub. No.: WO2010/109583
PCT Pub. Date: Sep. 30, 2010

(65) Prior Publication Data
US 2011/0314494 A1 Dec. 22, 2011

(51) Int. Cl.
*H04N 7/18* (2006.01)
*H04N 5/93* (2006.01)
*B61L 15/00* (2006.01)
*B61L 3/12* (2006.01)
*G06Q 30/02* (2012.01)

(52) U.S. Cl.
CPC ............ *B61L 15/009* (2013.01); *B61L 15/0072* (2013.01); *B61L 3/12* (2013.01); *G06Q 30/02* (2013.01); *B61L 15/0036* (2013.01)
USPC ................... 725/75; 725/32; 725/80; 725/81; 725/138; 725/139; 725/145; 381/86; 386/285

(58) Field of Classification Search
USPC ............... 725/32, 54, 74, 75, 78, 80, 81, 138, 725/139, 145, 146; 381/86; 386/285
See application file for complete search history.

(56) References Cited

U.S. PATENT DOCUMENTS 6,522,829 B1 * 2/2003 Muramatsu et al. .......... 386/283
8,051,443 B2 * 11/2011 Candelore et al. ............. 725/32
(Continued)

FOREIGN PATENT DOCUMENTS

JP 8-307417 A 11/1996
JP 08307417 A * 11/1996
(Continued)

OTHER PUBLICATIONS

International Search Report (PCT/ISA/210) issued on Jun. 23, 2009, by Japanese Patent Office as the International Searching Authority for International Application No. PCT/JP2009/055691.

(Continued)

*Primary Examiner* — Pinkal R Chokshi
(74) *Attorney, Agent, or Firm* — Buchanan Ingersoll & Rooney PC

(57) ABSTRACT

The on-train information providing device, which is provided with a controlling unit that transmits to the display device video data that is transmitted from the ground transmitting and receiving device to the on-train transmitting and receiving device, includes a storage unit that stores therein a program listing in which a valid period of video is stored in accordance with each advertisement, audio data transmitted from the ground transmitting and receiving device to the on-train transmitting and receiving device, and video data including audio data; and a sound recognizing unit that attaches a value of 1 or greater as an audio flag to the program listing when the video data does not include any audio data, and attaches 0 as the audio flag to the program listing when the video data includes audio data. The controlling unit sends the audio data corresponding to the audio flag to the radio radiating device.

7 Claims, 5 Drawing Sheets

(56) References Cited

U.S. PATENT DOCUMENTS

| | | | |
|---|---|---|---|
| 8,214,864 B2* | 7/2012 | Emoto et al. | 725/75 |
| 8,612,512 B1* | 12/2013 | Croak et al. | 709/203 |
| 2002/0133825 A1* | 9/2002 | Rufilanchas et al. | 725/75 |
| 2002/0162122 A1* | 10/2002 | Birks et al. | 725/136 |
| 2005/0289611 A1* | 12/2005 | Taki | 725/75 |
| 2008/0141297 A1* | 6/2008 | Dawson et al. | 725/32 |
| 2008/0288975 A1* | 11/2008 | Chen et al. | 725/32 |

FOREIGN PATENT DOCUMENTS

| | | |
|---|---|---|
| JP | 11-65564 A | 3/1999 |
| JP | 2000-181469 A | 6/2000 |
| JP | 2000-354228 A | 12/2000 |
| JP | 2001-202455 A | 7/2001 |
| JP | 2002-218331 A | 8/2002 |
| JP | 2003-285736 A | 10/2003 |
| JP | 2004-215123 A | 7/2004 |
| JP | 2004215123 A * | 7/2004 |
| JP | 2006-259253 A | 9/2006 |

OTHER PUBLICATIONS

Written Opinion (PCT/ISA/237) issued on Jun. 23, 2009, by Japanese Patent Office as the International Searching Authority for International Application No. PCT/JP2009/055691.

* cited by examiner

PROGRAM LISTING 40

| No. | VALID PERIOD (START) | VALID PERIOD (END) | VIDEO DATA NAME | AUDIO FLAG |
|---|---|---|---|---|
| 1 | 2008/01/16 0:00 | 2008/01/31 0:00 | BEVERAGE SALES COMPANY COMMERCIAL 1 | 0 |
| 2 | 2008/01/16 0:00 | 2008/01/31 0:00 | BEVERAGE SALES COMPANY COMMERCIAL 2 | 1 |
| 3 | 2008/01/16 0:00 | 2008/01/31 0:00 | HEALTH FOOD COMPANY COMMERCIAL 1 | 3 |
| 4 | 2008/01/31 0:00 | 2008/02/15 0:00 | HEALTH FOOD COMPANY COMMERCIAL 2 | 0 |
| 5 | 2008/01/31 0:00 | 2008/02/15 0:00 | TOY MAKER COMMERCIAL 1 | 2 |
| 6 | 2008/01/31 0:00 | 2008/02/15 0:00 | TOY MAKER COMMERCIAL 2 | 2 |
| ... | ... | ... | ... | ... |

FIG.5

AUDIO LISTING
50

| No. | AUDIO FILE NAME |
|---|---|
| 1 | 001.mp3 |
| 2 | 002.rm |
| 3 | 003.wav |
| 4 | 004.mp3 |
| ... | ... |

51 52

ON-TRAIN INFORMATION PROVIDING DEVICE, ON-TRAIN INFORMATION PROVIDING SYSTEM, AND AUDIO DATA PROVIDING METHOD

TECHNICAL FIELD

The present invention relates to an on-train information providing device, an on-train information providing system, and an audio data providing method with which advertising information is provided to passengers on a train, and especially to an on-train information providing device, an on-train information providing system, and an audio data providing method with which sound can be provided even when a moving image accompanied by sound and a moving image or a still image unaccompanied by sound are mixed in the advertisement video.

BACKGROUND ART

Now that people's lifestyles and activities have been diversified, advertisement video images presented by the mass media and the like have significant influence on these various people. Moreover, because people crave for updated information due to the widespread use of the Internet, advertisement video images posted or displayed on a train are greatly expected to produce advertisement effects. It is considered that, especially because the space in the train is closed and restricts passengers' activities, the advertisement effects are remarkably large, and therefore the demand has been rapidly increasing. To satisfy this demand, an LCD arranged above a door of a train car has been used as a display medium to provide the service of carrying advertisement video such as moving images and still images, as well as operation information such as the destination, stations to make a stop, the currently traveling location, and delay information.

The advertisement video placed by an advertiser contains both sound-accompanying moving or still images and no-sound moving or still images. Because the sound that accompanies the advertisement video may interrupt announcement of the operation information and the destination information, or because passengers may confuse switching of a sound-accompanying advertisement to a no-sound advertisement with a breakdown of the announcement system, they tend to be presented without sound or with caption. On the other hand, to make the advertisement video designed for a TV commercial or the like more appealing to passengers, there is a need for presenting it with accompanying sound.

As a means for satisfying such need, the advertising system described in Patent Document 1 below uses radio waves output from a wireless distributing device arranged on a train car to distribute sound to passengers' portable radios or the like.

[Patent Document 1] Japanese Patent Application Laid-open No. 2006-259253

DISCLOSURE OF INVENTION

Problem to be Solved by the Invention

According to the conventional technologies including the aforementioned Patent Document 1, however, when both sound-accompanying advertisements and no-sound advertisements are mixed, passengers may feel discomfort when the audio suddenly falls into silence.

The present invention has been conceived in light of the above. Its purpose is to offer an on-train information providing device, an on-train information providing system, and an audio data providing method, for presenting sound to passengers without any discomfort, when sound-accompanying advertisement video and no-sound advertisement video are mixed.

Means for Solving Problem

In order to attain the above object, in an on-train information providing device having a controlling unit that transmits, to a display device on a train, video data of on-train advertisement transmitted from a ground transmitting and receiving device to an on-train transmitting and receiving device, the on-train information providing device of the present invention includes: a storage unit that stores therein a program listing in which a valid period of advertisement video is stored in correspondence with each advertisement, first audio data transmitted from the ground transmitting and receiving device to the on-train transmitting and receiving device, and the video data including second audio data; and a sound recognizing unit that judges whether the video data includes the first audio data, and attaches information for distinguishing video data including the first audio data from video data not including the first audio data to the program listing. Additionally, the controlling unit sends the first audio data or the second audio data in correspondence with a first value or a second value to a wireless transmitting unit that transmits the first audio data or the second audio data as a radio signal.

Effect of the Invention

The present invention includes a sound recognizing unit that determines whether video data includes audio data and attaches a predetermined value to a program listing, and a controlling unit that sends audio data to a radio radiating device based on the predetermined value so that sound can be offered to passengers without any discomfort when sound-accompanying advertisement video and no-sound advertisement video are mixed.

BRIEF DESCRIPTION OF DRAWINGS

FIG. 5 is a diagram for showing an example of an audio listing for reproducing certain sound when the video data is not audio-accompanying video data.

EXPLANATIONS OF LETTERS OR NUMERALS

Figure 1:
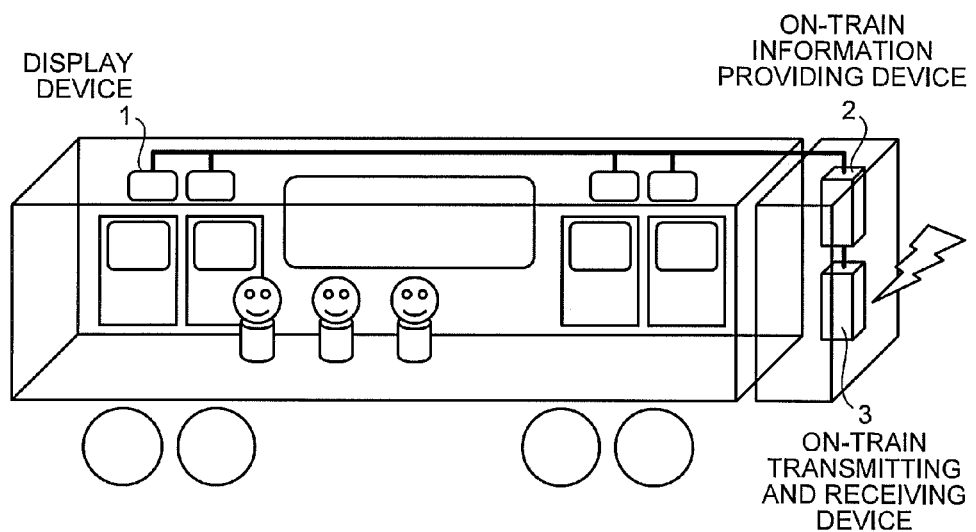
FIG. 1 is a diagram for showing an example configuration of an on-train information providing device and devices connected to the on-train information providing device according to the first embodiment.

1 display device
2 on-train information providing device
3 on-train transmitting and receiving device 5 ground transmitting and receiving device
6 information processing device
7 terminal device
8 storage unit
13 controlling unit
14 program list storage unit
16 video data storage unit
20 radio radiating device (wireless transmitting unit)
21 audio file storage unit
22 audio list storage unit
23 sound recognizing unit
40 program listing
41 valid period (start)
42 valid period (end)
43 video data name
44 audio flag
50 audio listing
51 file number (identification number)
52 audio file name
60 video data
61 audio data

BEST MODE(S) FOR CARRYING OUT THE INVENTION

Exemplary embodiments of an on-train information providing device, an on-train information providing system, and an audio data providing method according to the present invention are explained in detail below with reference to the drawings. The present invention is not limited by those embodiments, however.

Embodiment 1

(Structure of on-train Information Providing System)

FIG. 1 is a diagram for showing an example configuration of an on-train information providing device and devices connected to the on-train information providing device according to the first embodiment. The train car illustrated in FIG. 1 carries a display device 1, an on-train information providing device 2, and an on-train transmitting and receiving device 3. The display device 1 receives video data 60 relating to advertisement or operational information from the on-train information providing device 2, and presents such video to passengers of the train.

Figure 2:
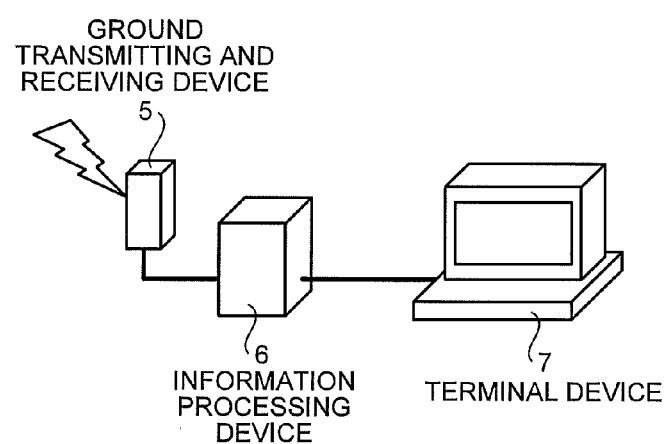
FIG. 2 is a diagram for showing an example configuration of a ground transmitting and receiving device and devices connected to the ground transmitting and receiving device.

FIG. 2 is a diagram for showing an example configuration of a ground transmitting and receiving device and devices connected to the ground transmitting and receiving device. A ground transmitting and receiving device 5 is situated, for example, on a station platform and connected to an information processing device 6 that processes a later-discussed program listing 40. A terminal device 7 such as a PC is connected to the information processing device 6 to be used for updating or the like of the program listing 40. As described above, the on-train information providing system according to the present embodiment is configured to have the display device 1, the on-train information providing device 2, the on-train transmitting and receiving device 3, the ground transmitting and receiving device 5, the information processing device 6, and the terminal device 7. The information processing device 6 and the terminal device 7 are arranged outside a station, for example, in the building of an advertising agency, and are connected to the ground transmitting and receiving device 5.

Figures 3, 4:
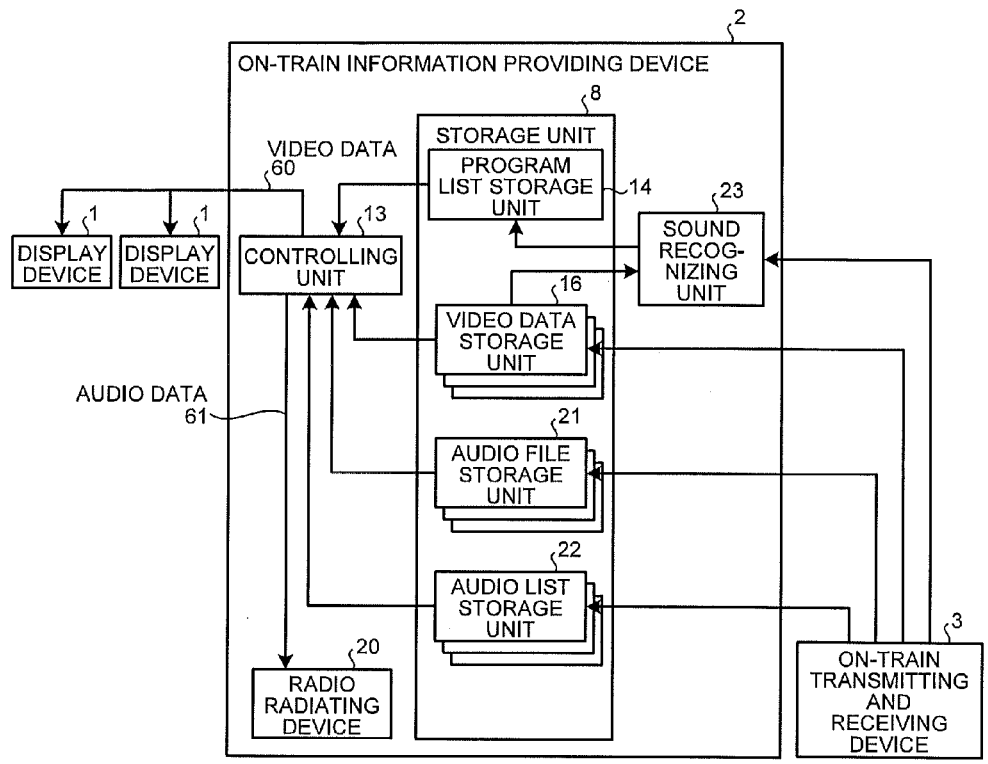
FIG. 3 is a diagram for showing an example structure of the on-train information providing device.
FIG. 4 is a diagram for showing an example of a program listing.

FIG. 3 is a diagram for showing an example structure of the on-train information providing device. FIG. 4 is a diagram for showing an example of a program listing, and FIG. 5 is a diagram for showing an example of an audio listing for reproducing certain audio when video data is not sound-accompanying video data.

In a program listing 40 of FIG. 4, a valid period (start) 41 indicating the running start date and time of video data 60, a valid period (end) 42 indicating the running end date and time of the video data 60, and an audio flag 44 are stored for each video data name 43 representing the title of the video data 60 in the order of serial numbers shown in the No. (number) column. This audio flag 44 is used when a controlling unit 13 determines a file of audio data 61 that is to be sent to a radio radiating device 20.

In an audio listing 50 of FIG. 5, file numbers 51 that are the identification numbers of audio file names 52 and are linked to the values of the above audio flags 44, and the audio file names 52 are stored in association with each other. Audio files corresponding to the audio file names 52 are stored in an audio file storage unit 21 illustrated in FIG. 3. The audio flags 44 are used when the controlling unit 13 determines the type of audio data 61 that is to be reproduced by the radio radiating device 20.

The contents and the number of items in the program listing 40 and the audio listing 50 are not limited to the above. Furthermore, in the program listing 40, the serial numbers may be arranged in descending order to judge the assignment of the audio flags 44.

(Structure of On-train Information Providing Device)

In FIG. 3, the on-train information providing device 2 includes the controlling unit 13, the radio radiating device 20 that is a wireless transmitting unit, a storage unit 8, and a sound recognizing unit 23, where the storage unit 8 includes a program list storage unit 14, a video data storage unit 16, the audio file storage unit 21, and an audio list storage unit 22. The radio radiating device 20 is arranged inside the on-train information providing device 2, but it may be arranged outside the on-train information providing device 2 in the same manner as the display device 1.

The on-train transmitting and receiving device 3 is mounted, for example, in the first car of a train, and it receives, when the train stops at the station platform, the program listing 40, the video data 60, the audio data 61 that is the first audio data, and the audio listing 50 transmitted from the ground transmitting and receiving device 5. The on-train information providing device 2 stores such information received by way of the on-train transmitting and receiving device 3 in the program list storage unit 14, the video data storage unit 16, the audio file storage unit 21, and the audio list storage unit 22, respectively.

Sound-accompanying advertising video and no-sound advertising video may be mixed in the video data 60, and not only moving images but also still images may be contained in the advertisement video. Moreover, the audio data 61 that is the second audio data may be contained in the video data 60 transmitted from the ground transmitting and receiving device 5. The audio data 61 is, for example, data compressed in MPEG format.

(Sound Recognizing Unit)

The sound recognizing unit 23 retrieves the program listing 40 from the program list storage unit 14, and also retrieves the video data 60 corresponding to the video data name 43 of the program listing 40 from the video data storage unit 16. The sound recognizing unit 23 determines whether the video data 60 is a still image or a moving image. If it is a moving image, the sound recognizing unit 23 determines whether the video data 60 includes audio data 61.

When the audio data 61 is contained, the sound recognizing unit 23 determines whether the sound level of the audio data 61 reproduced by way of the controlling unit 13 and the radio radiating device 20 exceeds a predetermined threshold for a video reproducing time m (seconds) of the video data 60. This is to prevent the audio data 61 in the audio file storage unit 21 from being reproduced despite the audio data 61 accompanying the video data 60, and also to prevent the announcement from being regarded as a system failure when the audio data 61 accompanies but the sound level is too low.

When the predetermined threshold value or greater is indicated, it is determined that the video data 60 is accompanied by sound. Then, the sound recognizing unit 23 assigns 0, which is the first value indicating that the audio data 61 accompanying the video data 60 is to be sent out, to the audio flag 44. If the sound level of the audio data 61 is not greater than or equal to the predetermined threshold value, a value greater than or equal to 1, which is the second value indicating that the audio data 61 received from the audio file storage unit 21 is to be sent out, is assigned to the audio flag 44.

If the video data 60 does not include any audio data 61, the sound recognizing unit 23 assigns a value greater than or equal to 1 to the audio flag 44. The sound recognizing unit 23 stores the program listing 40 to which the audio flag 44 is attached, back in the program list storage unit 14. The above first and second values are not limited to 0, or 1 or greater.

(Controlling Unit)

The controlling unit 13 reads the program listing 40 stored in the program list storage unit 14, and judges the valid period (start) 41, the valid period (end) 42, and the audio flag 44 of the video data 60 in the order of the serial numbers indicated in the program listing 40. The valid period (start) 41 and the valid period (end) 42 are used to determine whether the video data 60 of the advertisement video should be reproduced at the display device 1.

Furthermore, the controlling unit 13 reads the program listing 40, determines whether the n-th video data 60 falls within the valid period, and judges the value of the audio flag 44 for the video data 60 in the valid period. When the audio flag 44 is 0 or has no value, the controlling unit 13 reads the video data 60 from the video data storage unit 16, sends the video data 60 to the display device 1, and also sends the audio data 61 included in the video data 60 to the radio radiating device 20. The radio radiating device 20 sends the audio data 61 as a wireless signal to sound reproducing devices of the passengers.

On the other hand, when the audio flag 44 is 1 or greater, the controlling unit 13 reads the video data 60 corresponding to the video data name 43 from the video data storage unit 16, and sends the video data 60 to the display device 1. Furthermore, it reads the audio listing 50 from the audio list storage unit 22, selects the file number 51 corresponding to the value of the audio flag 44, and sends the audio data 61 of the selected file number 51 to the radio radiating device 20.

(Operation of Sound Recognizing Unit)

Figure 6:
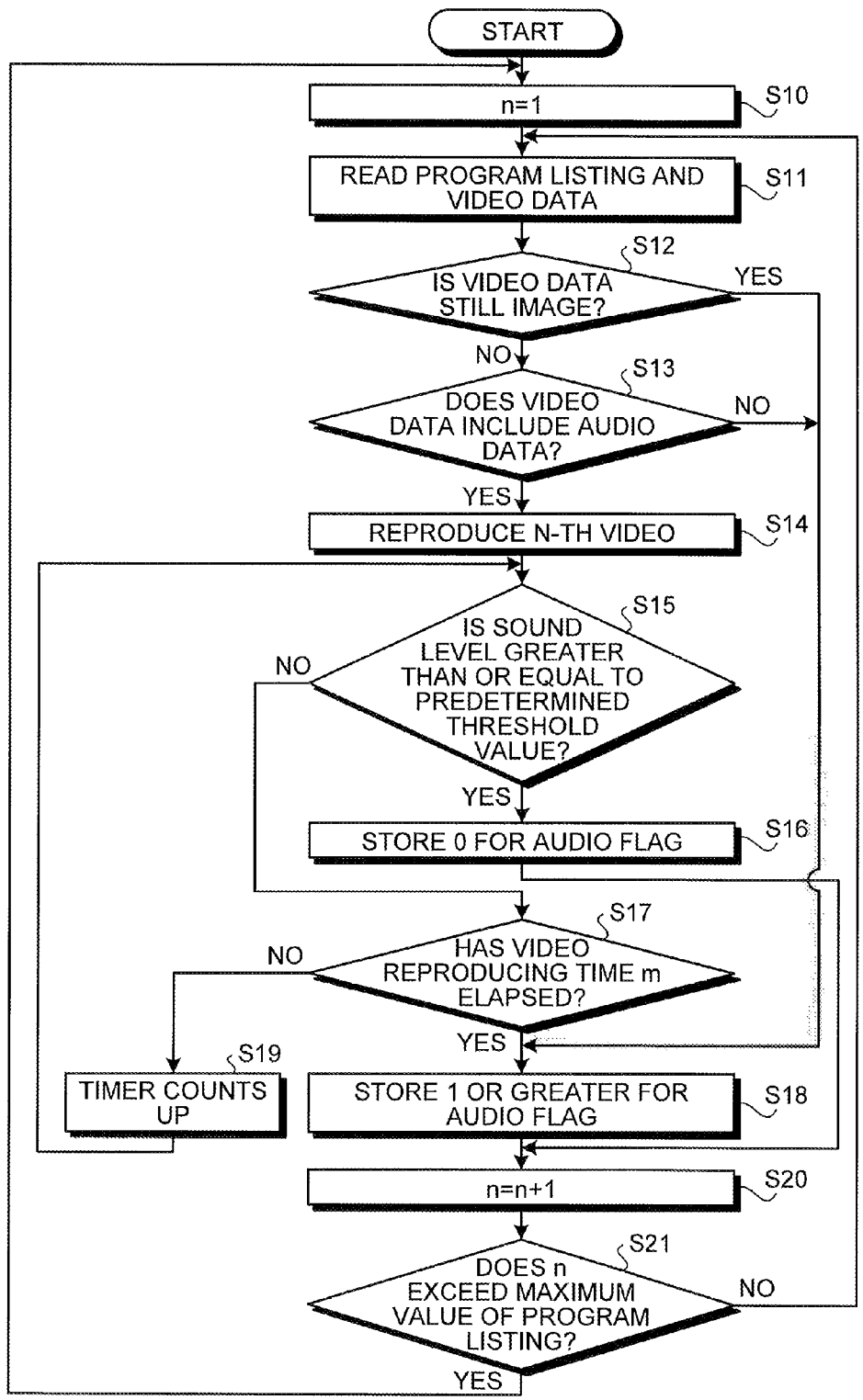
FIG. 6 is a flowchart for showing an operational flow of audio flag determination.

FIG. 6 is a flowchart of the operational flow of the determination of the audio flag. When the video data 60 is of the n-th=1 (step S10), the sound recognizing unit 23 retrieves the program listing 40 from the program list storage unit 14 and also the video data 60 from the video data storage unit 16, and obtains the video reproducing time m (seconds) (step S11).

Next, the sound recognizing unit 23 determines whether the video data 60 is a still image or a moving image, and when it is determined as a moving image (no at step S12), the sound recognizing unit 23 determines whether the video data 60 includes any audio data 61. When the audio data 61 is included (yes at step S13), the display device 1 reproduces the video data 60 of the n-th=1 (step S14). The above value n is a variable that is the number assigned in the program listing 40 to identify the video data name 43.

Next, the sound recognizing unit 23 determines whether the sound level of the audio data 61 indicates a value greater than or equal to the predetermined threshold until the video reproducing time m elapses in accordance with a timer. When the sound level of the audio data 61 is greater than or equal to the predetermined threshold (yes at step S15), it is determined that some sound is included, and 0 is entered as the audio flag 44 (step S16). When the sound level of the audio data 61 is not greater than or equal to the predetermined threshold (no at step S15), the process of step S17 is executed.

The timer performs counting up until the video reproducing time m elapses (no at step S17, and step S19), and the process from step S15 onward is repeated. Then, when the video reproducing time m elapses (yes at step S17), the sound recognizing unit 23 determines that there is no sound, enters a value of 1 or greater as the audio flag 44 (step S18), and increments n by 1 (step S20). Moreover, at step S16, when 0 is entered as the audio flag 44, n is incremented by 1 (step S20). If the value n exceeds the maximum value of the serial number of the program listing 40 after n is incremented by 1 (yes at step S21), the video data name 43 that exceeds the maximum value is defined as n=1 and the process from step S10 onward is repeated. If the value n does not exceed the maximum value of the serial number of the program listing 40 (no at step S21), the process from step S11 onward is repeated for the second video data 60 and subsequent items.

At step S12, if the video data 60 is a still image (yes at step S12), the sound recognizing unit 23 enters a value of 1 or greater to the audio flag 44. (step S18) Furthermore, at step S13, if the video data 60 does not contain the audio data 61 (no at step S13), the sound recognizing unit 23 enters a value of 1 or greater to the audio flag 44 (step S18).

As a result, a certain audio flag 44 is attached to the program listing 40, and the on-train information providing device 2 reproduces the video data 60 and the audio data 61. At step S16, the sound recognizing unit 23 is designed to monitor the sound level until the video reproducing time m elapses, but any predetermined period of time may be used instead of the video reproducing time m.

(Operation of Controlling Unit)

Figure 7:
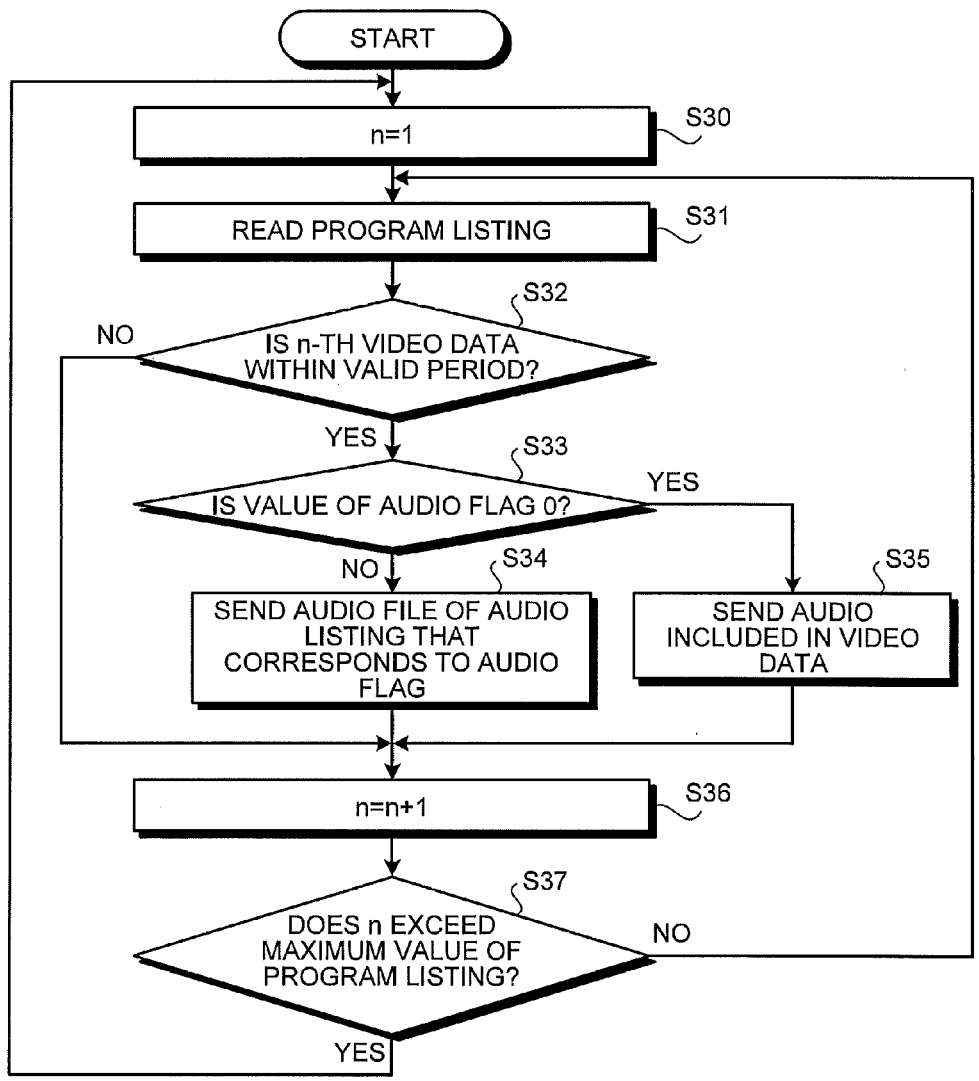
FIG. 7 is a flowchart for showing an operational flow of determination of sound that is to be reproduced in accordance with the value of the audio flag.

FIG. 7 is a flowchart of the operational flow of determination of sound that is to be reproduced in accordance with the value of the audio flag. When n-th=1 for the video data 60 (step S30), the controlling unit 13 retrieves the program listing 40 from the program list storage unit 14 and the video data 60 from the video data storage unit 16 (step S31). If the video data 60 is within the valid period (yes at step S32), the controlling unit 13 checks the value of the audio flag 44. On the other hand, if the video data 60 is not in the valid period (no at step S32), the controlling unit 13 executes the process from step S36 onward.

Next, when the value of the audio flag 44 is 1 or greater (no at step S33), the controlling unit 13 reads the video data 60 from the video data storage unit 16 and sends the video data 60 to the display device 1. Furthermore, the controlling unit 13 reads the audio listing 50 from the audio list storage unit 22, selects the file number 51 that corresponds to the value of the audio flag 44, and sends an audio file corresponding to the selected file number 51 to the radio radiating device 20 (step S34).

On the other hand, when the value of the audio flag 44 is 0 (yes at step S33), the controlling unit 13 reads the video data 60 that corresponds to the video data name 43 from the video data storage unit 16, and sends the video data 60 to the display device 1. Furthermore, the sound included in the video data 60 is sent to the radio radiating device 20 (step S35).

Next, the controlling unit 13 increments n by 1 (step S36). If the value n exceeds the maximum value of the serial number of the program listing 40 after n is incremented by 1 (yes at step S37), the controlling unit 13 determines the video data name 43 that exceeds the maximum value as n-th=1 and repeats the process from step S30 onward. Moreover, if the value n does not exceed the maximum value of the serial number of the program listing 40 (no at step S37), the controlling unit 13 repeats the process from step S31 onward for the second video data 60 and subsequent items.

If the reproduced sound is intentionally silenced, a silence file should be stored in the audio file storage unit 21, and an audio file name 52 is also entered into the audio listing 50 in correspondence with the silence file.

If multiple audio file name 52 are entered in the audio listing 50, the sound recognizing unit 23 may randomly select one of their file numbers 51 and assign the selected file number 51 as a value of 1 or greater to the audio flag 44. In addition, the controlling unit 13 may be configured to randomly select an audio file name 52 and reproduce it. As a result, the on-train information providing device 2 can reproduce various types of sound and thereby entertain them with video and sound, without making them tired. In this manner, whether the sound should be reproduced can be meticulously set in accordance with the conditions of the train car (how crowded and the like), a time of day, and the like.

The structure may be such that, if the length of the video reproducing time m of the video data 60 is longer than that of the randomly selected audio data 61, reproduction of other audio data 61 or the same audio data 61 may be continued from the beginning, after the reproduction of the randomly selected audio data 61 is completed, until the reproduction of the video data 60 is completed.

As explained above, the on-train information providing device 2 according to the present embodiment includes the sound recognizing unit 23 that determines whether the video data 60 contains the audio data 61 and assigns 0 or a value of 1 or greater to the audio flag 44, and the controlling unit 13 that sends the video data 60 to the display device 1 and the audio data 61 corresponding to the audio flag 44 to the radio radiating device 20 so that sound can be presented to the passengers even when both the sound-accompanying advertisement video and the no-sound advertisement video are mixed. As a result, when the sound-accompanying advertisement video is switched to the no-sound advertisement video, no discomfort is given to the passengers, and the passengers can tune in the radio wave frequency without becoming confused. Furthermore, unrelated sound would not be attached to advertisement video to which suitable sound is attached. Furthermore, this saves the content producers from having to prepare the audio data 61 for no-sound advertisement video, and therefore their workload can be reduced.

Embodiment 2

In an on-train information providing system according to the second embodiment, the information processing device 6 on the way side assigns 0 or a value of 1 or greater to the audio flag 44 in advance, and sends the program listing 40 to which the value of the audio flag 44 is assigned to the on-train transmitting and receiving device 3. Explanation is given below with reference to the drawings of the first embodiment.

In FIG. 2, the program listing 40 and the audio listing 50 are held in the information processing device 6, and the value of the audio flag 44 of the program listing 40 can be arbitrarily given by the terminal device 7. Then, when the train stops at a certain station at which the ground transmitting and receiving device 5 is situated, and a connection between the ground transmitting and receiving device 5 and the on-train transmitting and receiving device 3 is established, the ground transmitting and receiving device 5 sends the updated program listing 40, the audio listing 50, the video data 60, and the audio data 61 to the on-train transmitting and receiving device 3. The on-train information providing device 2 stores therein the information, and reproduces the sound in accordance with the predetermined operations of the first embodiment.

Because 0 or a value of 1 or greater is assigned to the audio flag 44, the sound recognizing unit 23 does not need to perform the operation of entering the value of the audio flag 44 into the program listing 40. In other words, according to the first embodiment, because the value of the audio flag 44 is not yet determined at the startup of the on-train information providing device 2, write time is required for writing the audio flag 44 into the program listing 40 when the advertisement video is sent from the ground transmitting and receiving device 5 to the on-train information providing device 2. According to the present embodiment, however, such time can be saved.

The structures of the on-train information providing device and the on-train information providing system according to the first and second embodiments are mere examples of the present invention. Those may be further combined with other known technologies, or may be partially omitted or modified without departing from the scope of the invention.

Industrial Applicability

As discussed above, the present invention is applicable to an on-train information providing device, an on-train information providing system, an audio data providing method for presenting advertisement information to passengers of a train, and especially effective in presenting sound even when both sound-accompanying moving images and no-sound moving or still images are mixed.

The invention claimed is:

1. An on-train information providing device that provides passengers of a train with video data of on-train advertisements transmitted from a ground transmitting and receiving device to an on-train transmitting and receiving device, comprising:

a storage unit that stores therein (1) a plurality of video data, (2) a program listing including a plurality of video data entries, wherein each video data entry includes a respective video data identified with a video data name that represents a title of the video data and in which a valid time period of the video data is stored in correspondence with each video data name representing the title of the video data, (3) a plurality of items of first audio data, and (4) an audio listing in which a file number that is an identification number of an audio file corresponding to each item of the first audio data is associated with an audio file name;

a sound recognizing unit that, prior to reproduction of video data to the passengers of the train,
  retrieves video data and the program listing from the storage unit,
  judges whether each video data within its respective valid time period includes second audio data,
  if the video data includes second audio data, determines whether a sound level of the second audio data indicates a predetermined threshold value or greater until a reproduction time of the video data ends,
  attach an audio flag, to each respective video data entry in the program listing,
    wherein the audio flag is a first value indicating that the second audio data is to be sent out (1) when the video data includes second audio data and (2) if the sound level of the second audio data is greater than or equal to the predetermined threshold value, and
    wherein the audio flag is a second value indicating that the first audio data is to be sent out (1) when the video data does not include second audio data or (2) when the video data includes second audio data and the sound level of the second audio data is not greater than or equal to the predetermined threshold value, and stores a revised program listing back in the storage unit, wherein the revised program listing includes the plurality of video data entries with the respective audio flags; and a controlling unit that (1) retrieves the revised program listing from storage, (2) determines, based on the audio flag attached to each respective video data entry, whether the respective video data is to include (i) first audio data stored in the storage unit or (ii) the second audio data, (3) transmits the video data to a display device that is arranged on the train to reproduce the video data, and (4) transmits the first audio data or the second audio data, based on said determination, to a wireless transmitting unit that transmits the first audio data or the second audio data as a radio signal to audio reproducing devices of the passengers, wherein when the controlling unit determines that the video data should include first audio data, the controlling unit selects an item of first audio data from the plurality of items of first audio data stored in the storage unit and transmits the selected item of first audio data to the wireless transmitting unit.

2. The on-train information providing device according to claim 1, wherein the storage unit is configured to:
store the audio listing in which the items of the first audio data are stored in accordance with the file numbers,
wherein the sound recognizing unit randomly selects one of the file numbers and attaches the selected file number as the first value to the audio flag of the program listing.

3. The on-train information providing device according to claim 1, wherein the storage unit stores therein a silent audio file as the first audio data when sound that is to be reproduced by the audio reproducing devices of the passengers is intentionally silenced, and also stores an audio file name corresponding to the first audio data that is silent in the audio listing.

4. The on-train information providing device according to claim 1, wherein when selecting an item of first audio data, the controlling unit randomly selects an audio file name, and reproduces the first audio data corresponding to the audio file name that is selected.

5. The on-train information providing device according to claim 4, wherein, when a length of video reproduction time of the video data is greater than the first audio data corresponding to the audio file name that is randomly selected, the controlling unit keeps reproducing, after reproduction of the first audio data is completed, other first audio data or the same first audio data from beginning until reproduction of the video data is completed.

6. An on-train information providing system comprising a ground transmitting and receiving device that transmits video data of on-train advertisements to an on-train transmitting and receiving device, an on-train information providing device that provides passengers of a train with the video data, wherein said on-train transmitting and receiving device transmits the video data received from the ground transmitting and receiving device to the on-train information providing device, and wherein:

the on-train information providing device comprises:
a storage unit that stores therein (1) a plurality of video data, (2) a program listing including a plurality of video data entries, wherein each video data entry includes respective video data identified with a video data name that represents a title of the video data and a valid time period, (3) a plurality of items of first audio data, and (4) an audio listing in which a file number that is an identification number of an audio file corresponding to each item of the first audio data is associated with an audio file name;

a sound recognizing unit that, prior to reproduction of video data to the passengers of the train,
retrieves video data and the program listing from the storage unit,
judges whether each video data within its respective valid time period includes second audio data,
if the video data includes second audio data, determines whether a sound level of the second audio data is equal to or greater than a predetermined threshold until a reproduction time of the video data ends,
attach an audio flag, to each respective video data entry in the program listing,
wherein the audio flag is a first value indicating that the second audio data is to be sent out (1) when the video data includes second audio data and (2) if the sound level of the second audio data is greater than or equal to the predetermined threshold value, and
wherein the audio flag is a second value indicating that the first audio data is to be sent out (1) when the video data does not include second audio data or (2) when the video data includes second audio data and the sound level of the second audio data is not greater than or equal to the predetermined threshold value, and
stores a revised program listing back in the storage unit, wherein the revised program listing includes the plurality of video data entries with the respective audio flags; and a controlling unit that (1) retrieves the revised program listing from storage, (2) determines, based on the audio flag attached to each respective video data entry, whether the respective video data is to include (i) first audio data stored in the storage unit or (ii) the second audio data, (3) transmits the video data to a display device that is arranged on the train to reproduce the video data, and (4) transmits the first audio data or the second audio data, based on the determination, to a wireless transmitting unit that is arranged on the train and transmits the first audio data or the second audio data as a radio signal to audio reproducing devices of the passengers, wherein when the controlling unit determines that the video data is to include first audio, the controlling unit selects an item of first audio data from the plurality of items of first audio data stored in the storage unit and transmits the selected item of first audio to the wireless transmitting unit.

7. An audio data providing method implemented by an on-train information providing device that provides video data of on-train advertisements transmitted from a ground transmitting and receiving device to an on-train transmitting and receiving device with passengers of a train, comprising:

storing, in a storing unit, (1) a plurality of video data, (2) a program listing including a plurality of video data entries, wherein each video data entry includes a respective video data identified with a video data name that represents a title of the video data and a valid time period, (3) a plurality of first audio data, and (4) an audio list in which a file number that is an identification number of an audio file corresponding to each item of the first audio data is associated with an audio file name;

retrieving, by a sound recognizing unit, prior to reproduction of video data to the passengers of the train, the video data and the program listing stored at the storing step;

judging, by the sound recognizing unit, prior to the reproduction of video data to the passengers of the train, whether each video data within its respective valid time period includes second audio data;

if the video data includes second audio data, determining whether a sound level of the second audio data is greater than or equal to a predetermined threshold value until a reproduction time of the video data ends, attaching an audio flag, to each respective video data entry in the program listing,
- wherein the audio flag is a first value indicating that the second audio data is to be sent out (1) when the video data includes second audio data and (2) if the sound level of the second audio data is greater than or equal to the predetermined threshold value, and
- wherein the audio flag is a second value indicating that the first audio data is to be sent out (1) when the video data does not include second audio data or (2) when the video data includes second audio data and the sound level of the second audio data is not greater than or equal to the predetermined threshold value, sending, by the sound recognizing unit, prior to the reproduction of video data to the passengers of the train, a revised program listing back to the storage unit, wherein the revised program listing includes the plurality of video data entries with the respective audio flags;

retrieving, by a controlling unit, the revised program listing from storage;

based on the audio flag attached to each respective video data entry, determining, by the controlling unit, whether the respective video data is to include (i) first audio data stored in the storage unit or (ii) the second audio data; and transmitting, by the controlling unit, (1) the video data to a display device that is arranged on the train to reproduce the video data, and (2) based on the determination, transmitting the first audio data or the second audio data to a wireless transmitting unit that is arranged on the train and transmits the first audio data or the second audio data as a radio signal to audio reproducing devices of the passengers, wherein when the controlling unit determines that the video data is to include first audio data stored in the storage unit, the controlling unit selects an item of first audio data from the plurality of items of first audio data stored in the storage unit and transmits the selected item of first audio data to the wireless transmitting unit.

* * * * *